(12) United States Patent
Lee et al.

(10) Patent No.: US 11,455,539 B2
(45) Date of Patent: Sep. 27, 2022

(54) QUANTIZATION METHOD AND DEVICE FOR WEIGHTS OF BATCH NORMALIZATION LAYER

(71) Applicant: ELECTRONICS AND TELECOMMUNICATIONS RESEARCH INSTITUTE, Daejeon (KR)

(72) Inventors: Mi Young Lee, Daejeon (KR); Byung Jo Kim, Sejong-si (KR); Seong Min Kim, Sejong-si (KR); Ju-Yeob Kim, Daejeon (KR); Jin Kyu Kim, Incheon (KR); Joo Hyun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 431 days.

(21) Appl. No.: 16/541,275

(22) Filed: Aug. 15, 2019

(65) Prior Publication Data

US 2020/0151568 A1    May 14, 2020

(30) Foreign Application Priority Data

Nov. 12, 2018    (KR) .................. 10-2018-0138455

(51) Int. Cl.
    *G06N 3/08*        (2006.01)
    *G06F 17/18*      (2006.01)

(52) U.S. Cl.
    CPC ............ *G06N 3/082* (2013.01); *G06F 17/18* (2013.01)

(58) Field of Classification Search
    CPC ............................... G06N 3/082; G06F 17/18
    USPC .......................................................... 706/15
    See application file for complete search history.

(56) References Cited

U.S. PATENT DOCUMENTS

| | | |
|---|---|---|
| 9,224,089 B2 | 12/2015 | Majumdar et al. |
| 2016/0086078 A1 | 3/2016 | Ji et al. |
| 2016/0162782 A1 | 6/2016 | Park |
| 2017/0289548 A1 | 10/2017 | Kim et al. |
| 2018/0048905 A1 | 2/2018 | Lim et al. |

(Continued)

FOREIGN PATENT DOCUMENTS

KR    10-2016-0069834 A    6/2016

OTHER PUBLICATIONS

Zhu, et al. "Trained Ternary Quantization", arXiv:1612.01064v3 [cs.LG] Feb. 23, 2017 (Year: 2017).*

(Continued)

*Primary Examiner* — Omar F Fernandez Rivas
*Assistant Examiner* — Selene A. Haedi
(74) *Attorney, Agent, or Firm* — Rabin & Berdo, P.C.

(57) ABSTRACT

An embodiment of the present invention provides a quantization method for weights of a plurality of batch normalization layers, including: receiving a plurality of previously learned first weights of the plurality of batch normalization layers; obtaining first distribution information of the plurality of first weights; performing a first quantization on the plurality of first weights using the first distribution information to obtain a plurality of second weights; obtaining second distribution information of the plurality of second weights; and performing a second quantization on the plurality of second weights using the second distribution information to obtain a plurality of final weights, and thereby reducing an error that may occur when quantizing the weight of the batch normalization layer.

14 Claims, 4 Drawing Sheets

(56) References Cited

U.S. PATENT DOCUMENTS

| | | | |
|---|---|---|---|
| 2019/0251445 A1* | 8/2019 | Movshovitz-Attias | ........................ G06N 3/08 |
| 2020/0159534 A1* | 5/2020 | Li | ........................ G06N 3/0454 |
| 2021/0182077 A1* | 6/2021 | Chen | ........................ G06K 9/62 |

OTHER PUBLICATIONS

Chen et. al., "FxpNet: Training a deep convolutional neural network in fixed-point representation", 2017 (Year: 2017).*

Aojun Zhou et al., "Incremental Network Quantization: Towards Lossless CNNS With Low-Precision Weights", arXiv:1702.03044v2, 1-14pages (Aug. 25, 2017.).

Naveen Mellempudi et al., "Ternary Neural Networks with Fine-Grained Quantization", arXiv:1705.01462v3, 1-11pages (May 30, 2017.).

* cited by examiner

FIG. 4
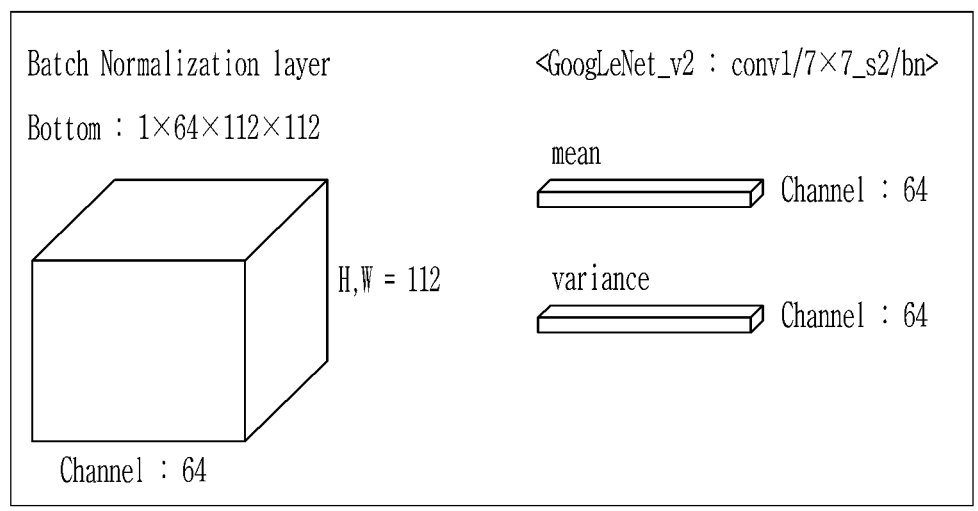
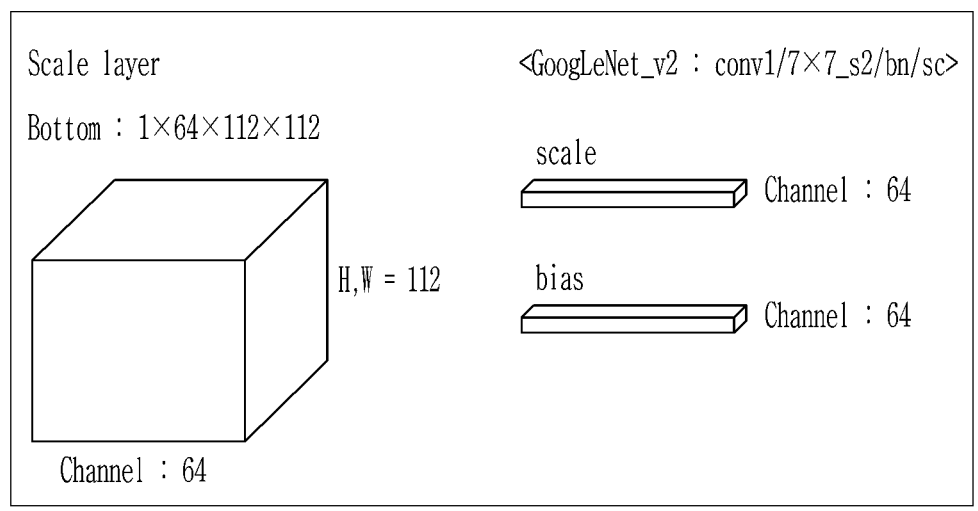

QUANTIZATION METHOD AND DEVICE FOR WEIGHTS OF BATCH NORMALIZATION LAYER

CROSS-REFERENCE TO RELATED APPLICATION

This application claims priority to and the benefit of Korean Patent Application No. 10-2018-0138455 filed in the Korean Intellectual Property Office on Nov. 12, 2018, the entire contents of which are incorporated herein by reference.

BACKGROUND OF THE INVENTION

(a) Field of the Invention

The present invention relates to a quantization method and device for weights of a batch normalization layer.

(b) Description of the Related Art

A batch normalization layer is a neural network layer that normalizes the mean of input data to 0 and the variance thereof to 1. The batch normalization layer is designed to increase learning speed without causing problems such as gradient vanishing of input data or gradient exploding of input data when learning a neural network using input data, and to this end, the batch normalization layer may normalize the input data and then scale and shift the normalized data.

When a neural network including the batch normalization layer is implemented in hardware, it is necessary to quantize a weight of an initially specified batch normalization layer in order to reduce a bit-width requirement amount of an operator and to reduce a memory capacity required to store the weight of the batch normalization layer.

A method of quantizing the weight of the batch normalization layer includes a dynamic range floating point quantization method and an integer power-of-two quantization method. However, neither method performs well for the weight quantization of the batch normalization layer.

For example, the dynamic range floating point quantization method has a disadvantage in that it may not sufficiently accommodate a wide range of values of weights of the batch normalization layer. Meanwhile, the integer power-of-two quantization method can accommodate a wide range of values, but has a disadvantage in that the interval between the quantization values is very wide.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide a method and device that may accommodate the wide range weights of the batch normalization layer while allowing the interval of the quantization result values to be densely formed.

An embodiment of the present invention provides a quantization method for weights of a plurality of batch normalization layers, including: receiving a plurality of previously learned first weights of the plurality of batch normalization layers; obtaining first distribution information of the plurality of first weights; performing a first quantization on the plurality of first weights using the first distribution information to obtain a plurality of second weights; obtaining second distribution information of the plurality of second weights; and performing a second quantization on the plurality of second weights using the second distribution information to obtain a plurality of final weights.

The quantization method may further include assigning a first bit width, which is a part of all bit widths assigned to the quantization, to the first quantization.

The quantization method may further include assigning a second bit width, which is a part of all bit widths assigned to the quantization, to the second quantization.

The first bit width and the second bit width may be the same bit width.

The first bit width and the second bit width may be 4 bits.

The first distribution information may include an average value and a variance value of the plurality of first weights, and the second distribution information may include an average value and a variance value of the plurality of second weights.

The first quantization may be an integer power-of-two quantization, and the second quantization may be a dynamic range floating point quantization.

The quantization method may further include repeating the receiving, the obtaining of the distribution information, and the quantizing, for the plurality of first weights a predetermined number of times.

The quantization method may further include repeatedly applying a quantization process for the first layer of the remaining layers among the plurality of batch normalization layers.

Another embodiment of the present invention provides a batch normalization layer quantization device, including: an input part that receives a plurality of previously learned first weights and input data of a plurality of batch normalization layers; a processor that obtains first distribution information of the plurality of first weights, performs a first quantization on the plurality of first weights using the first distribution information to obtain a plurality of second weights, obtains second distribution information of the second plurality of weights, performs a second quantization on the plurality of second weights using the second distribution information to obtain a plurality of final weights, and performs normalization on the input data using the plurality of final weights; and a memory that stores the plurality of final weights.

The processor may assign a first bit width, which is a part of all bit widths assigned to the quantization, to the first quantization.

The processor may assign a second bit width, which is a part of all bit widths assigned to the quantization, to the second quantization.

The first bit width and the second bit width may be the same.

The first bit width and the second bit width may be 4 bits.

The first quantization may be an integer power-of-two quantization, and the second quantization may be a dynamic range floating point quantization.

The first distribution information may include an average value and a variance value of the plurality of first weights, and the second distribution information may include an average value and a variance value of the plurality of second weights.

The processor may repeat the receiving, the obtaining of the distribution information, and the quantizing, for the plurality of first weights a predetermined number of times.

Another embodiment of the present invention provides a quantization method for weights of a plurality of batch normalization layers, including: receiving a plurality of previously learned first weights of the plurality of batch normalization layers; obtaining first distribution information of the plurality of first weights; performing a first quantization on the plurality of first weights using the first distribution information to obtain a plurality of second weights; obtaining second distribution information of the plurality of second weights; performing a second quantization on the plurality of second weights using the second distribution information to obtain a plurality of final weights; and performing normalization on the input data using the plurality of final weights.

The first distribution information may include an average value and a variance value of the plurality of first weights, and the second distribution information may include an average value and a variance value of the plurality of second weights.

The quantization method may further include repeatedly applying a quantization process for the first layer of the remaining layers among the plurality of batch normalization layers.

According to the embodiment of the present invention, it is possible to effectively cover a wide distribution of weight values of a batch normalization layer and narrow a quantization interval, thereby reducing errors that may occur when quantizing the weight of the batch normalization layer.

According to the embodiment of the present invention, when a neural network including a batch normalization layer is implemented in hardware, deterioration in performance that may occur when quantizing the batch normalization layer may be minimized, and since a bit width required amount of an operator is reduced, power for operation may be reduced, and memory capacity required for storing the weight of the batch normalization layer may be reduced.

BRIEF DESCRIPTION OF THE DRAWINGS

FIG. 4 illustrates a batch normalization layer according to an embodiment of the present invention.

DETAILED DESCRIPTION OF THE EMBODIMENTS

Figure 1:
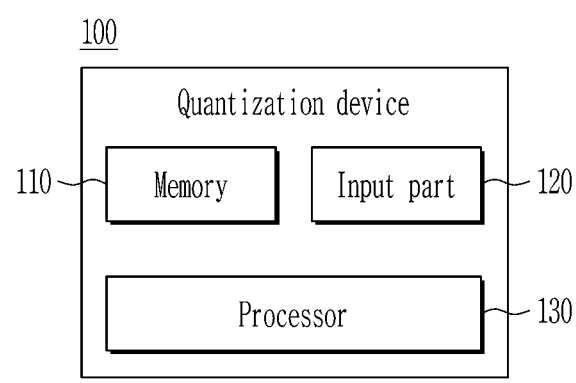
FIG. 1 illustrates a block diagram of a quantization device according to an embodiment of the present invention.

Hereinafter, the present invention will be described more fully with reference to the accompanying drawings, in which exemplary embodiments of the invention are shown. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 illustrates a block diagram of a quantization device according to an embodiment of the present invention.

As shown in FIG. 1, a batch normalization layer quantization device 100 may include a memory 110, an input part 120, and a processor 130.

The memory 110 may store input data to be normalized by the batch normalization layer. The memory 110 may store previously-learned weights and quantized weights.

The input part 120 may receive input data from the outside and transmit the input data to the processor 130. The input part 120 may receive the previously-learned weight from the memory 110 or from the outside and transmit it to the processor 130.

The processor 130 may perform steps S201 to S211 shown in FIG. 2 to quantize weights, which will be described later in detail.

Figure 2:
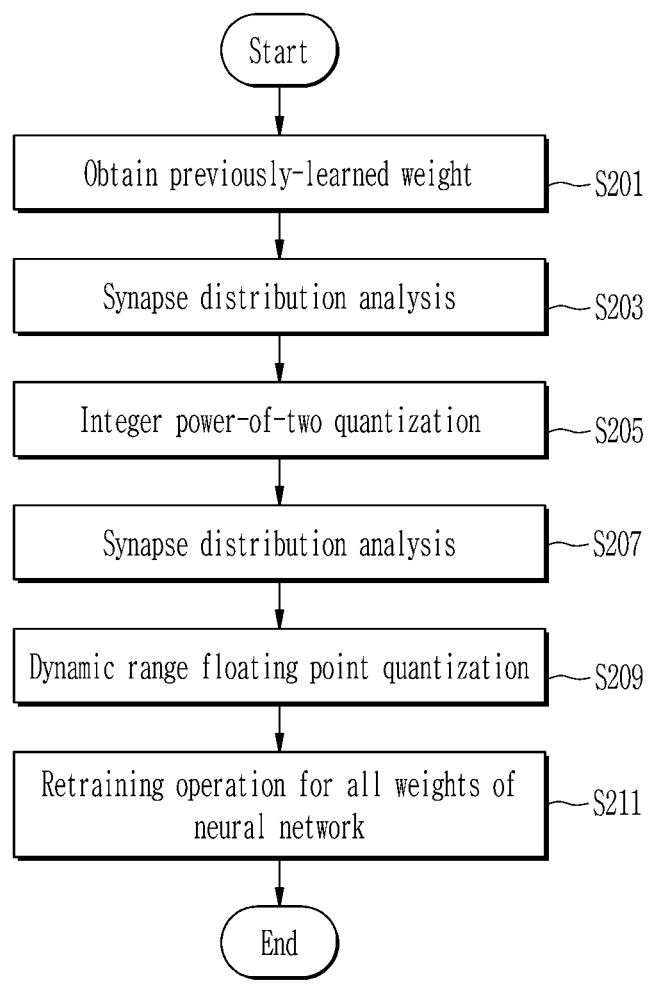
FIG. 2 illustrates a flowchart of a quantization method according to an embodiment of the present invention.

FIG. 2 illustrates a flowchart of a quantization method according to an embodiment of the present invention.

As shown in FIG. 2, first, the processor 130 may obtain a previously-learned weight of the batch normalization layer from the input part 120 (S201).

For example, the weight may be a synapse weight of a synapse that connects neurons in the neural network.

For example, the processor 130 may normalize all input data, and alternatively, it may normalize a mini-batch of sample input data that are a part of all the input data. The mini-batch may mean a predetermined number of sample input data among the entire input data of the batch normalization layer. A size of the mini-batch (the number of sample input data) may be preset by a manufacturer or a user, but is not limited thereto. A set B of the sample input data included in the mini-batch may be defined as $B=\{x_1, x_2, \ldots, x_m\}$.

The processor 130 normalizes at least some of the input data of the mini-batch or all the input data, and it may scale and shift and bias the normalized input data to a conversion data $y_i$.

The processor 130 may obtain the conversion data $y_i$ by the following Equation 1.

$$y_i = BN_{\gamma,\beta}(x_i) \quad \text{(Equation 1)}$$

Here, BN is a batch normalization function, $\gamma$ is a scale coefficient, and $\beta$ is a shift coefficient.

As shown in Equation 1 above, the processor 130 may obtain the conversion data $y_i$ by applying the batch normalization function to all input data $x_i$.

In order to obtain the batch normalization function for obtaining the conversion data $y_i$, the processor 130 may calculate the mini-batch mean $\mu B$ by Equation 2 below.

$$\mu B \leftarrow \frac{1}{m}\sum_{i=1}^{m} x_i \quad \text{(Equation 2)}$$

Here, m may be a size of the mini-batch (the number of sample input data).

As shown in Equation 2, the processor 130 may calculate the mini-batch mean $\mu B$ of the sample input data of the mini-batch by obtaining a sum of respective sample input data of the mini-batch among the input data, and dividing the sum of the respective sample input data of the mini-batch by the size m of the mini-batch.

The processor 130 may calculate a variance $\sigma^2$ ($\sigma$ is a standard deviation) using the following Equation 3.

$$\sigma_B^2 \leftarrow \frac{1}{m}\sum_{i=1}^{m}(x_i - \mu_B)^2 \quad \text{(Equation 3)}$$

As shown in Equation 3 above, the processor 130 may calculate the variance $\sigma^2$ by calculating respective squares of respective values obtained by subtracting the mini-batch mean $\mu B$ value from respective sample input data of the mini-batch for all the sample input data included in the mini-batch, and then adding them, and by dividing the added value by the size m of the mini-batch.

The processor 130 may normalize the input data $x_i$ using Equation 4 below.

$$\hat{x}_i \leftarrow \frac{x_i - \mu_B}{\sqrt{\sigma_B^2 + \epsilon}} \quad \text{(Equation 4)}$$

Here, $\epsilon$ is a constant, and may be previously set.

As shown in Equation 4 above, the processor 130 may normalize the input data $x_i$ by dividing a value obtained by subtracting the average $\mu B$ of the mini-batch calculated above from each input data $x_i$ by a sum of the variance $\sigma 2$ of the mini-batch and the constant value $\epsilon$.

After normalizing the input data $x_i$, the processor 130 may convert the normalized input data $x_i$ to the conversion data $y_i$, and the conversion data $y_i$ may be represented by the following Equation 5.

$$y_i \leftarrow \gamma \hat{x}_i + \beta = \quad \text{(Equation 5)}$$
$$\gamma\left(\frac{x_l - \mu_B}{\sqrt{\sigma_B^2 + \epsilon}}\right) + \beta = \frac{\gamma}{\sqrt{\sigma_B^2 + \epsilon}} x_l + \left(-\frac{\gamma \cdot \mu_B}{\sqrt{\sigma_B^2 + \epsilon}} + \beta\right)$$

Here, $$\frac{\gamma}{\sqrt{\sigma_B^2 + \epsilon}}$$

is a scale weight, which may be simplified to $W_0$, and $$\left(-\frac{\gamma \mu_B}{\sqrt{\sigma_B^2 + \epsilon}} + \beta\right)$$

is a shift weight, which may be simplified to $W_1$.

As shown in Equation 5 above, the conversion data $y_i$ may be represented by adding the shift weight to the product of $x_i$ and the scale weight.

Referring again to FIG. 1, after step S201, the processor 130 may set previously-learned values (for example, $W_0=1$, $W_1=0$) to the weights $W_0$ and $W_{One}$, and may perform a first synapse distribution analysis with respect to the previously-set weights W0 and W1 of the batch normalization layer (S203).

As described above, the processor 130 may initially previously set 1 to the scale weight $W_0$ and may previously set 0 to the shift weight $W_1$, but the present invention is not limited thereto.

For example, the processor 130 may obtain first distribution information through a first synapse distribution analysis (max (abs (W))) on the previously-learned first weights W0 and W1, and the first distribution information may include information about an average value and a variance value of the first weights W0 and W1 and a size of the first weights W0 and W1.

After step S203, the processor 130 may apply an integer power-of-two quantization to the previously-learned first weights W0 and W1 using the first distribution information calculated in step S203 to obtain the integer power-of-two quantized second weight (S205).

The processor 130 may perform the integer power-of-two quantization on the first weights through the following Equations 6 to 10 to obtain the second weights ($WIQ_L$) ($WIQ_0$ and $WIQ_1$).

First, the processor 130 may obtain the integer n1 using Equation 6 and Equation 7.

$$s = \max(\text{abs}(W_l)) \quad \text{(Equation 6)}$$

$$n_1 = \text{floor}\left(\log_2\left(\frac{4s}{3}\right)\right) \quad \text{(Equation 7)}$$

Here, n1 is an integer of 0 or more, $W_L$ may mean $W_0$ or $W_1$, and floor(x) means the largest integer not greater than x.

As shown in Equation 6 and Equation 7, the processor 130 may calculate a maximum value s of a size of WL(W0, W1), calculate a log value of 2 of 4/3*s using the s, and apply the calculated log value to the floor function to obtain n1.

The processor 130 may then obtain the integer n2 using Equation 8 below.

$$n_2 = n_1 + 1 - \frac{2^{(b-1)}}{2} \quad \text{(Equation 8)}$$

Here, n2 is an integer of 0 or more, which is smaller than or equal to n1, and b may mean a bit width that is previously assigned to the integer power-of-two quantization.

As shown in Equation 8, the processor 130 may calculate n2 by adding a value obtained by dividing a constant 1 and a power of n−1 of 2 by 2 to the integer n1, which is calculated by Equation 7.

The processor 130 may then calculate an integer set $P_L$ using the following Equation 9.

$$P_l = \{\pm 2^{n1}, \ldots, \pm 2^{n2}, 0\} \quad \text{(Equation 9)}$$

As shown in Equation 9, the processor 130 may determine a set $P_L$ consisting of terms of 2 powers from n1 calculated by Equation 7 to n2 calculated by Equation 8.

Then, the processor 130 may calculate the second weight $WIQ_L(i, j)(WIQ_0(i, j), WIQ_1(i, j))$ whose index is (i, j), in a corresponding layer by using Equation 10.

$$\widetilde{WIQ}_l(i, j) = \quad \text{(Equation 10)}$$
$$\begin{cases} \beta \text{sgn}(W_l(i, j)) & \text{if } (\alpha + \beta)/2 \leq \text{abs}(W_l(i, j)) < 3\beta/2 \\ 0 & \text{otherwise} \end{cases},$$

Here, sgn(x) is a function that outputs −1 when x is negative, 0 when x is 0, and 1 when x is positive. In addition, $\alpha$ and $\beta$ may mean terms adjacent to each other in the $P_L$ set.

As shown in Equation 10, the processor 130 may determine $WIQ_L(i, j)$ as a value obtained by multiplying $\beta$ by an output value obtained by inputting $W_L(i, j)$ into the sgn function in a corresponding layer when a value of $W_L(i, j)$ whose index is (i, j) is greater than or equal to a value obtained by dividing a sum of $\alpha$ and $\beta$ by 2 and smaller than a value obtained by dividing 3*$\beta$ by 2. Alternatively, the processor 130 may determine $WIQ_L(i, j)$ as 0 when $W_L(i, j)$ is smaller than the sum of $\alpha$ and $\beta$ divided by 2, or greater than or equal to 3*$\beta$ divided by 2.

After step S205, the processor 130 may perform a second synapse distribution analysis with respect to the second weights $WIQ_L(i, j)(WIQ_0(i, j), WIQ_1(i, j))$ to which an integer power-of-two quantization is applied (S207).

For example, the processor 130 may obtain second distribution information through the second synapse distribution analysis $(\max(\text{abs}(W-WIQ_L)))$ on the second weights $WIQ_L(i, j)(WIQ_0(i, j), WIQ_1(i, j))$, and the second distribution information may include information with respect to an average value, a variance value, and a size of the second weights of the second weights $WIQ_L(i, j)(WIQ_0(i, j), WIQ_1(i, j))$.

After step S207, the processor 130 may perform dynamic range floating point quantization on the second weights $WIQ_L(i, j)(WIQ_0(i, j), WIQ_1(i, j))$ of the batch normalization layer using the second distribution information, thereby calculating final weights $WDQ_L(i, j)(WDQ_0(i, j), WDQ_1(i, j))$ (S209).

The processor 130 may perform the dynamic range floating point quantization on the second weights through the following Equation 11 to Equation 14 to obtain the final weights.

First, the processor 130 may calculate an integer length $I_L$ using the following Equation 11.

$$il = \text{ceil}(\log 2(\max(\text{abs}(WIQ_l(i,j))))+1)$$

Here, the function ceil(x) is a function that rounds off any decimal point value of x.

As shown in Equation 11, the processor 130 may calculate a log value of 2 of the maximum value of $WIQ_L(i, j)$, and add 1 to the log value to obtain a result value input to the ceil function as $I_L$.

The processor 130 may then calculate a fractional length $I_L$ using the following Equation 12.

$$fl(\text{fractional length}) = b - il \quad \text{(Equation 12)}$$

Here, b may mean a bit width assigned to the dynamic range floating point quantization.

As shown in Equation 12 above, the processor 130 may obtain a value, which is $f_L$, obtained by subtracting $I_L$ calculated by Equation 11 from b.

The processor 130 may then calculate an integer set $P_L$ using the following Equation 13.

$$P_l = \{\pm(2^{(-fl)}(0, 1, \ldots, (2^{(b-1)}-1))\}$$

As shown in Equation 13 above, the processor 130 determines a set $P_L$ consisting of a product of powers of 2 including 0 and powers from a power of 2 with an exponent of 0 to a power of 2 with an exponent b−1 multiplied by $(-f_L)$ power of 2.

The processor 130 may then use the following Equation (14) to calculate a final weight $WDQ_L(i, j)$ whose index is (i, j) in a corresponding layer.

(Equation 14)

$$WDQ_l(i,j) = \begin{cases} \max_d * \text{sgn}(W_l(i,j)) & \text{if abs}(W_l(i,j)) \geq \max\_d \\ \beta \text{sgn}(W_l(i,j)) & \beta - (2^{(-fl-1)}) \leq \text{abs}(W_l(i,j)) < \beta + (2^{(-fl-1)}) \end{cases}$$

Here, max_d is a maximum element in the set $P_L$, and it may be represented as $\max\_d = (2^{(b-1)}-1)*(2^{(-fl)})$. In addition, β is a positive element in the set $P_L$.

As shown in Equation 14, when a value of $WIQ_L(i, j)$ is greater than or equal to the max_d, the processor 130 may calculate a final weight $WDQ_L(i, j)$ by multiplying an output value obtained by inputting a value of $WIQ_L(i, j)$ into the sgn function by max_d. Alternatively, when the value of $WIQ_L(i, j)$ is greater than or equal to $\beta - 2^{(-fL-1)}$ and smaller than $\beta + 2^{(-fL-1)}$, the processor 130 may calculate the final weight $WDQ_L(i, j)$ by multiplying the output value obtained by inputting the $WIQ_L(i, j)$ into the sgn function by β.

The processor 130 may then perform a predetermined number of retraining operations for the final weights (S211).

That is, the processor 130 may re-execute learning a preset number of times (for example, a number required by a user, a learning rate) for the final weight of the batch normalization layer.

The processor 130 may perform step S201 to step S211 for the weights of all the batch normalization layers in the neural network.

For example, the processor 130 may execute the above-described steps S201 to S211 and may re-perform learning as many times as required by using different IQs (bitwidth_IQ) and different DQs (bitwidth_DQ) for different weights of different batch normalization layers in the neural network.

Figure 3:
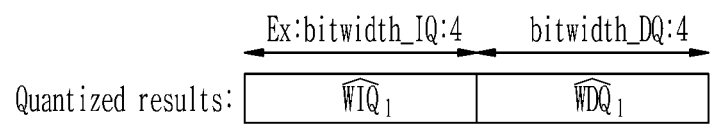
FIG. 3 illustrates a weight that is a quantized result according to an embodiment of the present invention.

FIG. 3 illustrates a weight that is a quantized result according to an embodiment of the present invention.

As shown in FIG. 3, the bit width (bitwidth_IQ) of the IQ may be the bit width assigned to the integer power-of-two quantization. The processor 130 may set some bit widths of all the quantization bit widths of an operator (not shown) included in the batch normalization layer quantization device to be assigned to the integer power-of-two quantization. For example, the processor 130 may assign 4 bits out of all the 8 bits of the operator to the bit width for the integer power-of-two quantization, but the present invention is not limited thereto.

As shown in FIG. 3, the bit width (bitwidth_DQ) of the DQ may be the bit width assigned to the dynamic range floating point quantization. The processor 130 may set the DQ bit width (bitwidth_DQ) of all the quantization bit widths to the bit width assigned to the dynamic range floating point quantization. For example, the processor 130 may set 4 bits of all the quantization bit widths of 8 bits to the DQ bit width, but the present invention is not limited thereto.

FIG. 4 illustrates a batch normalization layer according to an embodiment of the present invention.

As shown in FIG. 4, for example, the batch normalization layer is configured using the method applied to the GoogLeNet_v2 neural network and may be configured based on the batch normalization layer configuration of CAFFE, which is an open source neural network learning framework, but the present invention is not limited thereto.

For example, the batch normalization layer may be divided into a batch normalization layer and a scale layer, but is not limited thereto.

The batch normalization layer may estimate (feed forward) the output data from the input data using the final weights obtained in FIG. 1 to FIG. 3.

The CAFFE framework defines a neural network interference operation, which may mean a process of obtaining the final weight.

The CAFFE framework may define the input (x) of the neural network interference operation as a bottom and the output (y) of the neural network interference operation as a top, but is not limited thereto.

For example, a batch size of the bottom of the batch normalization layer may be 1×64×112×112. That is, the batch size of the bottom of the batch normalization layer may be set to 1, a channel size (ch) to 64, an input image vertical size (h) to 112, and an input image horizontal size (w) to 112.

The processor 130 may calculate the output (top, scale weight, shift weight) using the input (bottom, previously-learned mean (input channel size=64), variance (input channel size=64)). For example, the processor 130 may perform the batch normalization and obtain the top components (ch, h, w) using the mean and variance of the channels in which the input data are included for all components of the input data.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A quantization method for performing a quantization, comprising:
   for a plurality of batch normalization layers implemented in hardware in a neural network, performing operations for quantizing weights of the plurality of batch normalization layers to reduce a bit-width requirement amount and to reduce a memory capacity required to store the weights, the operations including:
   receiving a plurality of previously-learned first weights of the plurality of batch normalization layers;
   obtaining first distribution information of the plurality of previously-learned first weights;
   performing a first quantization on the plurality of previously-learned first weights using the first distribution information to obtain a plurality of second weights;
   assigning a first bit width, which is a part of all bit widths assigned to the quantization, to the first quantization;
   obtaining second distribution information of the plurality of second weights;
   assigning a second bit width, which is a part of all bit widths assigned to the quantization, to a second quantization;
   performing the second quantization on the plurality of second weights using the second distribution information to obtain a plurality of final weights having the first bit width and the second bit width;
   wherein the first bit width and the second bit width are a same bit width that is reduced from bit widths of the previously-learned first weights before the quantization.

2. The quantization method of claim 1, wherein the first bit width and the second bit width are 4 bits.

3. The quantization method of claim 1, wherein the first distribution information includes an average value and a variance value of the plurality of previously-learned first weights, and the second distribution information includes an average value and a variance value of the plurality of second weights.

4. The quantization method of claim 1, wherein
   the first quantization is an integer power-of-two quantization, and
   the second quantization is a dynamic range floating point quantization.

5. The quantization method of claim 1, further comprising repeating the receiving, the obtaining of the first distribution information, and the first quantizing, for the plurality of previously-learned first weights a predetermined number of times.

6. The quantization method of claim 1, further comprising repeatedly applying a quantization process for a first layer of remaining layers among the plurality of batch normalization layers.

7. A batch normalization layer quantization device for performing a quantization, comprising:
   an input part that receives a plurality of previously-learned first weights of a plurality of batch normalization layers implemented in hardware in a neural network, and input data of the plurality of batch normalization layers;
   a processor that, for the plurality of batch normalization layers, performs operations for quantizing weights of the plurality of batch normalization layers to reduce a bit-width requirement amount and to reduce a memory capacity required to store the weights, the operations including:
   obtaining first distribution information of the plurality of previously-learned first weights;
   performing a first quantization on the plurality of previously-learned first weights using the first distribution information to obtain a plurality of second weights;
   assigning a first bit width, which is a part of all bit widths assigned to the quantization, to the first quantization;
   obtaining second distribution information of the second plurality of weights;
   assigning a second bit width, which is a part of all bit widths assigned to the quantization, to a second quantization;
   performing the second quantization on the plurality of second weights using the second distribution information to obtain a plurality of final weights having the first bit width and the second bit width; and
   performing normalization on the input data using the plurality of final weights; and
   a memory that stores the plurality of final weights using the first bit width and the second bit width;
   wherein the first bit width and the second bit width are a same bit width that is reduced from bit widths of the previously-learned first weights before the quantization.

8. The batch normalization layer quantization device of claim 7, wherein the first bit width and the second bit width are 4 bits.

9. The batch normalization layer quantization device of claim 7, wherein
   the first quantization is an integer power-of-two quantization, and
   the second quantization is a dynamic range floating point quantization.

10. The batch normalization layer quantization device of claim 7, wherein the first distribution information includes an average value and a variance value of the plurality of previously-learned first weights, and the second distribution information includes an average value and a variance value of the plurality of second weights.

11. The batch normalization layer quantization device of claim 7, wherein the processor repeats the receiving, the obtaining of the first distribution information, and the first quantizing, for the plurality of previously-learned first weights a predetermined number of times.

12. A quantization method for performing a quantization, comprising:
   for a plurality of batch normalization layers implemented in hardware in a neural network, performing operations for quantizing weights of the plurality of batch normalization layers to reduce a bit-width requirement amount and to reduce a memory capacity required to store the weights, the operations including:

receiving a plurality of previously-learned first weights of the plurality of batch normalization layers;

obtaining first distribution information of the plurality of previously-learned first weights;

performing a first quantization on the plurality of previously-learned first weights using the first distribution information to obtain a plurality of second weights;

assigning a first bit width, which is a part of all bit widths assigned to the quantization, to the first quantization;

obtaining second distribution information of the plurality of second weights; assigning a second bit width, which is a part of all bit widths assigned to the quantization, to a second quantization;

performing the second quantization on the plurality of second weights using the second distribution information to obtain a plurality of final weights having the first bit width and the second bit width; and performing normalization on an input data using the plurality of final weights;

wherein the first bit width and the second bit width are a same bit width that is reduced from bit widths of the previously-learned first weights before the quantization.

13. The quantization method of claim 12, wherein the first distribution information includes an average value and a variance value of the plurality of previously-learned first weights, and the second distribution information includes an average value and a variance value of the plurality of second weights.

14. The quantization method of claim 13, further comprising repeatedly applying a quantization process for a first layer of remaining layers among the plurality of batch normalization layers.

* * * * *